(12) United States Patent
Liu et al.

(10) Patent No.: US 6,356,517 B1
(45) Date of Patent: Mar. 12, 2002

(54) OPTICAL DISC WITH A CONTROL CHIP

(75) Inventors: Job Tien-Chiang Liu, 3 Fl., No. 76, Paochung Rd., Hsintien City Taipei Hsien; Chiao-Li Lin, Taichung, both of (TW)

(73) Assignee: Job Tien-Chiang Liu, Taipei Hsien (TW)

( * ) Notice: Subject to any disclaimer, the term of this patent is extended or adjusted under 35 U.S.C. 154(b) by 0 days.

(21) Appl. No.: 09/699,201

(22) Filed: Oct. 27, 2000

(51) Int. Cl.⁷ .............................................. G11B 13/00
(52) U.S. Cl. ......................................... 369/14; 369/282
(58) Field of Search ........................... 369/14, 15, 273, 369/272, 287, 282, 289; 360/133; 380/21, 4, 48, 20

(56) References Cited

U.S. PATENT DOCUMENTS

| | | | | |
|---|---|---|---|---|
| 4,814,924 A | * | 3/1989 | Ozeki | 360/133 |
| 5,119,353 A | * | 6/1992 | Asakura | 369/13 |
| 5,235,586 A | * | 8/1993 | Feamster et al. | 369/100 |
| 5,617,380 A | * | 4/1997 | Holmstrom | 369/14 |
| 5,822,291 A | * | 10/1998 | Brindze et al. | 369/94 |
| 5,905,798 A | * | 5/1999 | Nerlikar et al. | 380/3 |
| 6,005,940 A | * | 12/1999 | Kulinets | 380/21 |
| 6,137,767 A | * | 10/2000 | Ro et al. | 369/14 |
| 6,226,109 B1 | * | 5/2001 | Tompkin et al. | 369/282 |

* cited by examiner

*Primary Examiner*—Tan Dinh
(74) *Attorney, Agent, or Firm*—Rabin & Berdo, P.C.

(57) ABSTRACT

An optical disc has a data disc, a transparent disc to enclose and protect the data disc and an annular control chip securely attached to the clamping area of the transparent disc. The control chip records the data area allocation. Consequently, the data area allocation written in the control chip will not be copied by conventional copying techniques. An infringing disc will not work even when all of the data files on the data disc are completely copied. Therefore, a good security is provided, and infringement can be avoided. In addition, the optical disc can work as a smart card after bonding with a chip on it. The function of the optical disc can be improved.

8 Claims, 5 Drawing Sheets

OPTICAL DISC WITH A CONTROL CHIP

BACKGROUND OF THE INVENTION

1. Field of the Invention

The present invention relates to an optical disc, and more particularly to an optical disc with a control chip.

2. Description of Related Art

Optical discs referring to all CD and DVD formats specified by Phillips Corporation are widely used to hold data like sound, video or computer programs. Conventional optical discs comprise a data disc and a transparent disc to cover and protect the data disc. The data disc contains multiple tracks to store data. A lead-in-area is defined in the zero track of the disc. The lead-in-area is composed of 256 error-correction-blocks (ECC). Some of the 256 ECC are used to record some important information of the disc like the version of the disc, the space of the disc, the content of each track and the data area allocation (DAA) and so on. When the optical disc is put into a player or recorder to read or write data from or to the disc of CD AUDIO, CD-ROM, DVD VIDEO, DVD ROM, CD-R, CD-RW, DVD-RW, or DVD-RAM, the player or recorder will first check the DAA, so the player or recorder can read the track with the data or locate the next available blank track.

To protect against illegal copying of the data on the disc, a security function is always placed on the optical disc. The conventional security technique on optical discs adds a key to the data, so that only an authorized person or player can use or read the data on the disc. However, modern copying techniques can copy all of the data including the security key. Conventional security techniques cannot absolutely protect against infringement.

To overcome the shortcomings, the present invention provides an improved optical disc with a control chip to mitigate or obviate the aforementioned problems.

SUMMARY OF THE INVENTION

The main objective of the invention is to provide an optical disc with a control chip to protect against infringement and to improve the function of the disc. The control chip has a die to hold all or some of DAA data for the data disc. By such an arrangement, an unauthorized copy of the disc will not work even when all of the data files on the data disc are copied. Good security is provided.

A further objective of the invention is to provide an optical disc with a control chip containing software algorithm and memory. This can provide accessibility, encryption, user history and other tracking information. By checking the data inside of the control chip through Internet, the optical disc has a function same as a smart card and can store more data.

DETAILED DESCRIPTION OF PREFERRED EMBODIMENT

Figure 1:
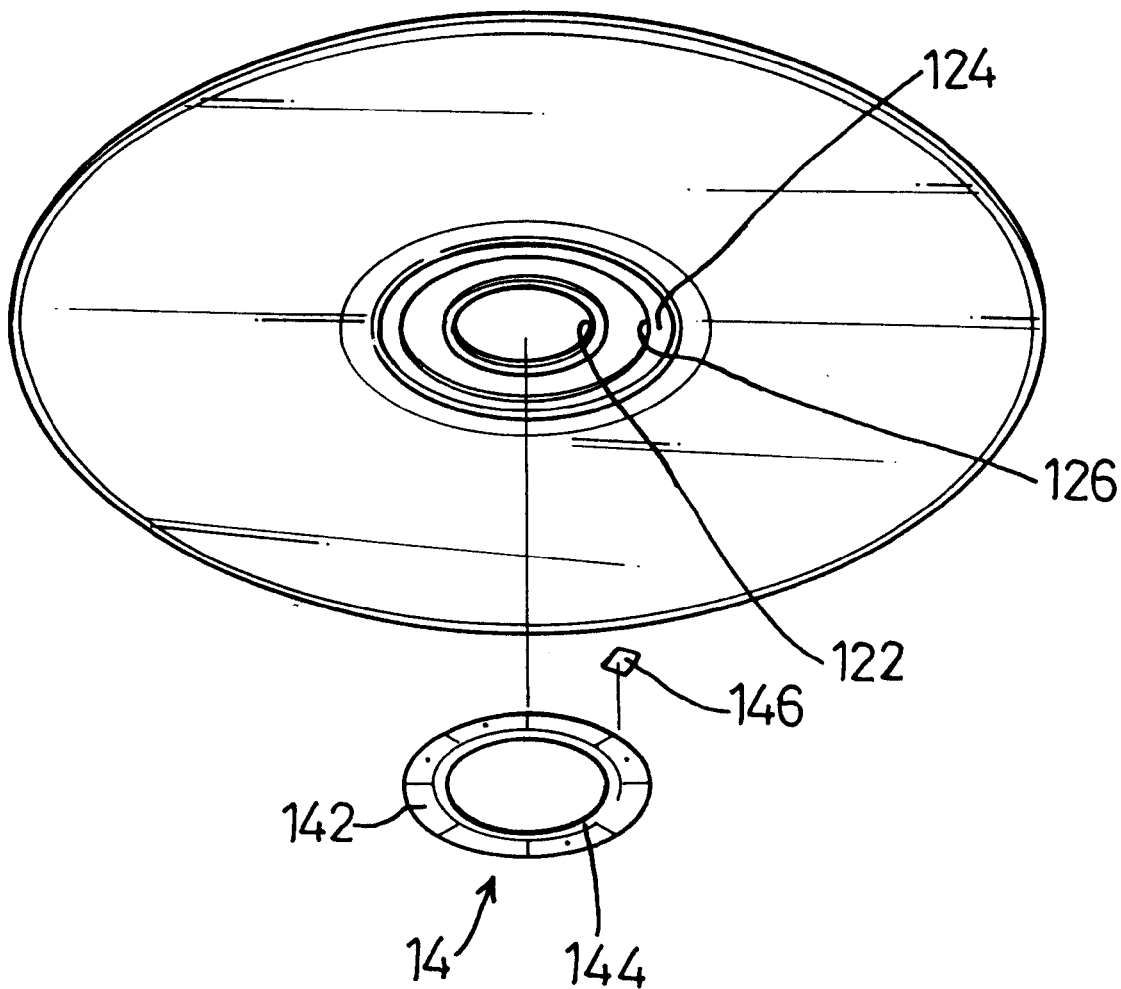
FIG. 1 is an exploded perspective view of an optical disc with a control chip in accordance with the present invention.
Figure 2:
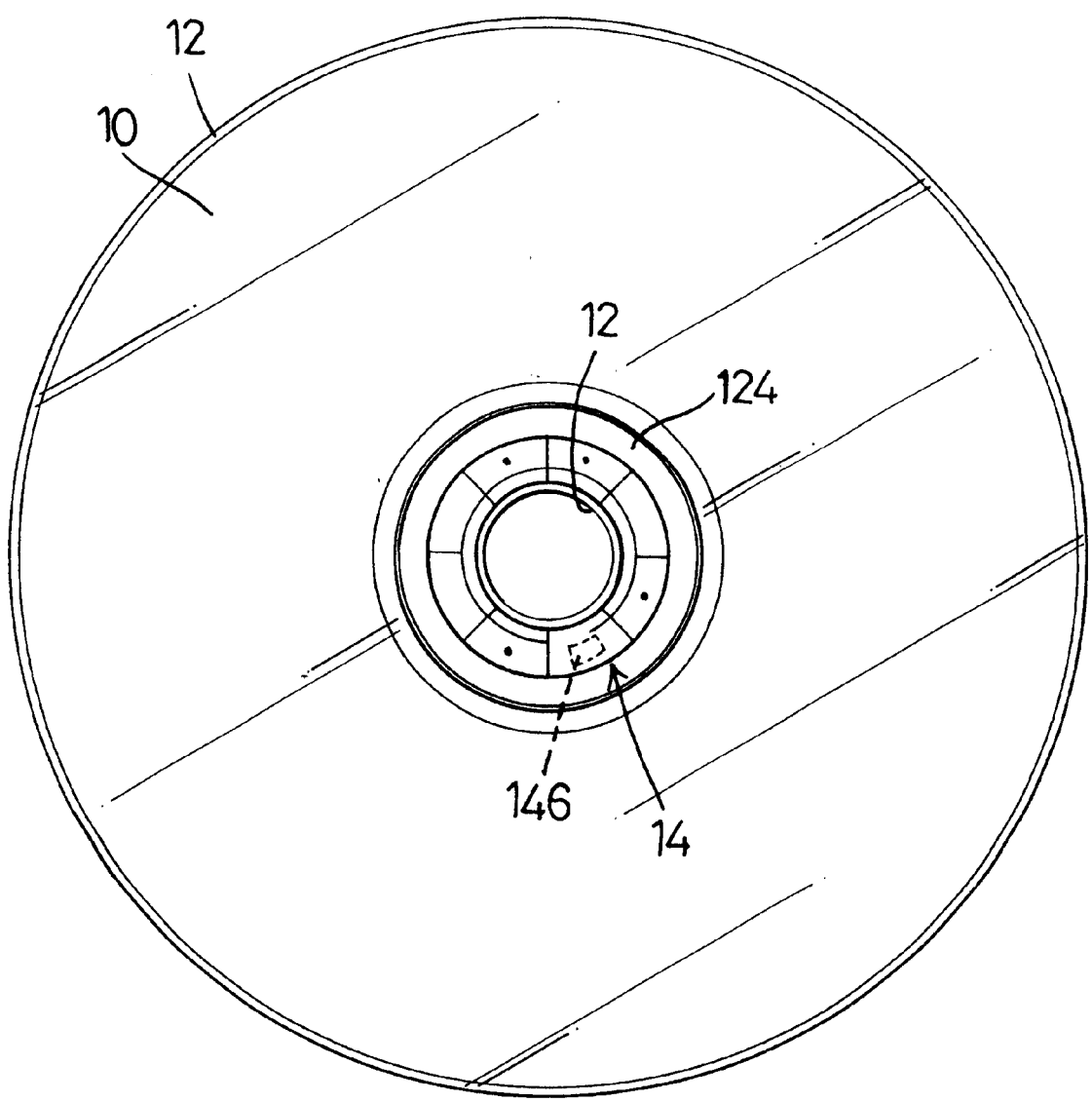
FIG. 2 is a bottom plan view of the optical disc in FIG. 1.
Figure 3:
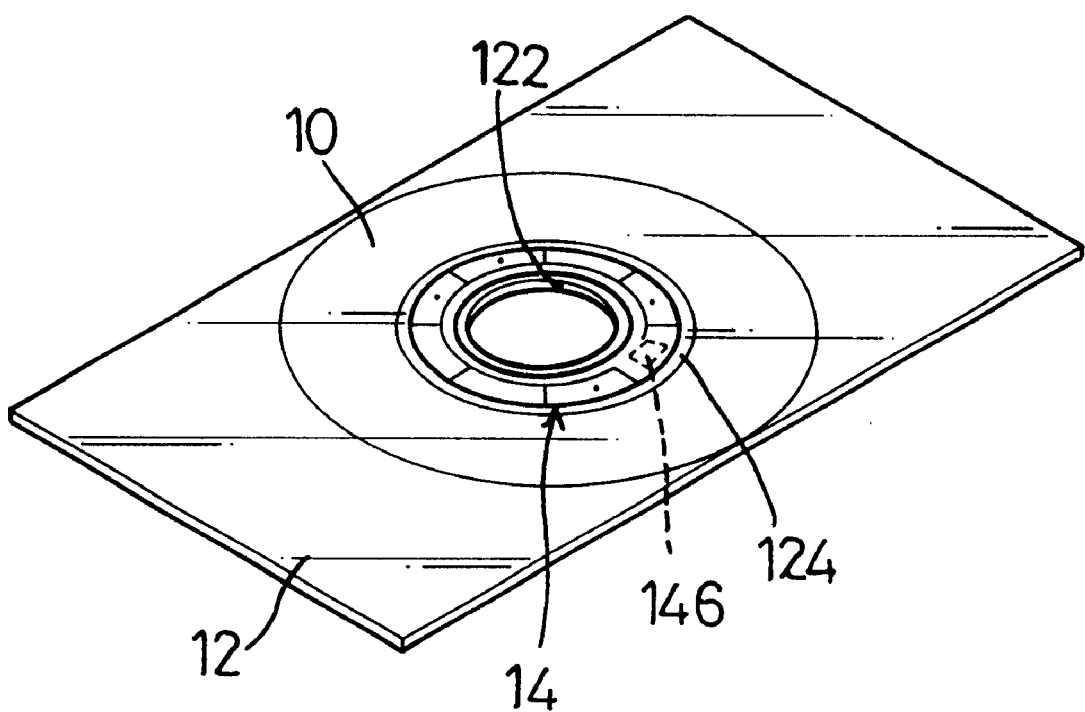
FIG. 3 is a perspective view of another embodiment of an optical disc with a control chip in accordance with the present invention.

With reference to FIGS. 1–3, an optical disc in accordance with the present invention comprises an annular data disc (10), a transparent disc (12) and an annular control chip (14). The data disc (10) is enclosed in the transparent disc (12) and stores the desired data. The transparent disc (12) can be a circular disc shown in FIGS. 1 and 2 or a quadrilateral disc. A central hole (122) is defined in the transparent disc (12) to engage with the spindle of the player, recorder or holder. An annular clamping area (124) is defined between the inner edge of the data disc (10) and the central hole (122). A concentric recess (126) is defined in the clamping area (124). The control chip (14) is securely pressed into the recess (126) in the clamping area (124).

Figure 4:
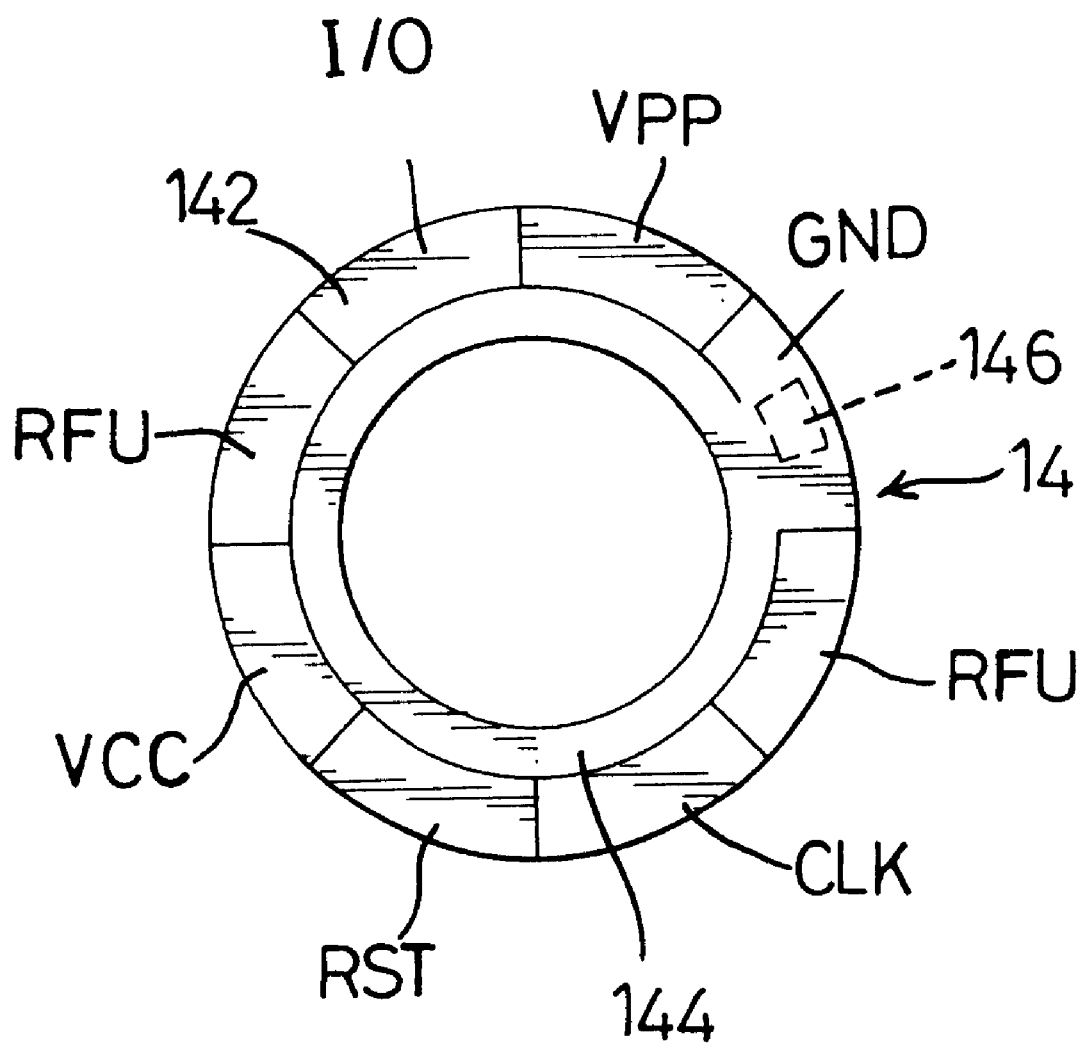
FIG. 4 is a bottom plan view of the control chip in FIG. 1 showing the arrangement of each sector of the outer ring.

With reference to FIGS. 2 and 4, the control chip (14) includes of an outer ring (142), an inner contact ring (144) as a ground and a die (146). The outer ring (142) is divided into eight radial contact sections. One of the contact sections is connected to the inner contact ring (144), such that that contact section is a grounding node. The eight contact sections are respectively defined in a clockwise direction according to ISO-7816 part 3 as Voltage of Power (Vcc), Reserve for User (RFU), Data Input/ Output (I/O), Voltage Power of Programming (VPP), Ground (GND), RFU, Clock (CLK), and Reset (RST). The die (146) is secured to one of the contact sections and electrically connected with all of the contact sections. A compact-disc operation system (CDOS) program is written on the die (146) to control the operation of the control chip (14). All or some of the DAA data of the files stored in the data disc (10) is written on the die (146), such that a desired DAA corresponding to the data disc (10) can be written on the control chip (14).

Figure 5:
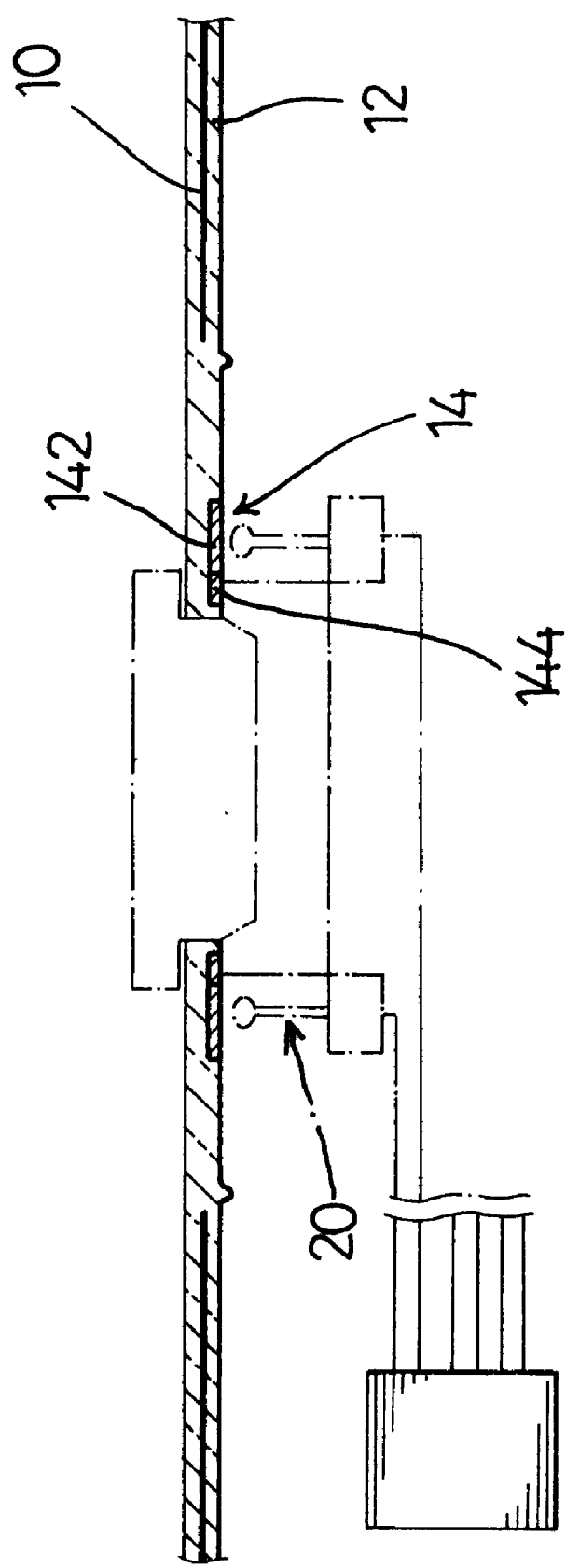
FIG. 5 is an operational side plan view in partial section of the optical disc in FIG. 1.

To fit the optical disc with the control chip (14), with reference to FIGS. 4 and 5, nine probes (20) are mounted in the conventional player or recorder according to the arrangement of the eight contact sections and the inner contact ring (144) of the control chip (14). When the optical disc is put into the player or recorder, the nine probes arranged in the player or recorder will respectively touch the individual sections of the outer ring (142) and the inner ring (144). The GND portion can be determined by sensing which two of the probes are short circuited, such that the position of the other contact sections can also be determined. The probes (20) leaves the control chip (14) after the positions of the sections have been determined. The player or recorder then reads the DAA data written in the die (146) through the CDOS. Consequently, the player or recorder can read the data file according to the DAA written in the control chip (14).

With such an optical disc, because current copying techniques are only able to copy data files stored on the data disc (10) but not the DAA data stored in the control disc (14), an infringing disc will not work even when all of the data files are completely copied. Consequently, good security effect can be provided. To add further security, a key or Pin program can be written into the CDOS. Accordingly, only an authorized person can write, change or amend the content of the control chip (14).

In practice, the CDOS can contain a counter program. The counter program can allow a user to read or use the optical disc a predetermined number of times. In addition, a user can get the password for the key or pin program through the Internet as he or she pays a corresponding fee. The user can be allowed to use the entire or some portion of the files on the optical disc. The data or files stored on the optical disc cannot be allowed to be used without the password. The security effect of the optical disc will be further improved. Furthermore, use of the optical disc will become more versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical disc for use in a player or recorder, comprising:

an annular data disc containing at least one data file;

a transparent disc to enclose the data disc and having:
  a central hole defined in the transparent disc; and
  an annular clamping area defined between an inner edge of the data disc and a periphery defining the central hole; and an annular control chip securely attached concentrically to the clamping area and for containing at least some data area allocation (DAA) data, data area allocation (DAA) data recording the locations of the at least one data file on the data disc;

wherein the annular control chip includes an outer ring, an inner ring which acts as a ground, and a die;

wherein the outer ring is divided into a plural number of radial contact sections, one of the plural number of radial sections being connected to the inner ring;

wherein one of the plural number of radial sections contains the die, the die being secured to the one of the plural number of radial contact sections and electrically connected with all of the plural number of radial contact sections;

wherein the die is for having at least some of the data area allocation (DAA) data written therein; and wherein, in operation, the plural number of radial contact sections are contacted by a plurality of probes, equal in number to said plural number, disposed in a player or recorder, and the inner ring is also contacted by an additional probe in the player or recorder, whereby the player or recorder writes/reads at least some of the data area allocation (DAA) data to/from the die.

2. The optical disc as claimed in claim 1, wherein a recess is defined in the clamping area to receive the control chip.

3. The optical disc as claimed in claim 1, wherein the plural number of radial contact sections are respectively defined in a clockwise direction according to ISO-7816 part 3 as Voltage of Power (Vcc), Reserve for User (RFU), Data Input/ Output (1/0), Voltage Power of Programming (VPP), Ground (GND), RFU, Clock (CLK), and Reset (RST).

4. The optical disc as claimed in claim 1, further comprising a compact-disc operation system (CDOS) program written in the die, which controls the operation of the control chip.

5. The optical disc as claimed in claim 4, wherein the compact-disc operation system (CDOS) program contains a key program to allow an authorized person to write, change or amend the content of the control chip.

6. The optical disc as claimed in claim 4, wherein the compact-disc operation system (CDOS) program contains a pin program to allow an authorized person to write, change or amend the content of the control chip.

7. The optical disc as claimed in claim 1, wherein the data area allocation (DAA) data records the locations of all of the data files on the data disc.

8. The optical disc as claimed in claim 1, wherein the data area allocation (DAA) data records the locations of some but not all of the data files on the data disc.

* * * * *